United States Patent
Shamaie

(10) Patent No.: US 8,565,535 B2
(45) Date of Patent: Oct. 22, 2013

(54) REJECTING OUT-OF-VOCABULARY WORDS

(75) Inventor: Atid Shamaie, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 726 days.

(21) Appl. No.: 12/194,780

(22) Filed: Aug. 20, 2008

(65) Prior Publication Data

US 2009/0052785 A1 Feb. 26, 2009

Related U.S. Application Data

(60) Provisional application No. 60/956,784, filed on Aug. 20, 2007, provisional application No. 60/956,776, filed on Aug. 20, 2007.

(51) Int. Cl.
*G06K 9/62* (2006.01)
*G06K 9/00* (2006.01)

(52) U.S. Cl.
USPC .......................................... 382/209; 382/187

(58) Field of Classification Search
USPC .......................................................... 382/209
See application file for complete search history.

(56) References Cited

U.S. PATENT DOCUMENTS

| | | | | |
|---|---|---|---|---|
| 5,319,721 A * | 6/1994 | Chefalas et al. | ............... | 382/160 |
| 5,381,489 A * | 1/1995 | Bernzott et al. | ............... | 382/176 |
| 5,454,043 A * | 9/1995 | Freeman | ........................ | 382/168 |
| 5,682,439 A * | 10/1997 | Beernink et al. | ............... | 382/187 |
| 6,226,403 B1 * | 5/2001 | Parthasarathy | ............... | 382/187 |
| 6,272,242 B1 * | 8/2001 | Saitoh et al. | ................... | 382/187 |
| 6,285,786 B1 * | 9/2001 | Seni et al. | ....................... | 382/187 |
| 6,304,674 B1 | 10/2001 | Cass et al. | | |
| 6,339,655 B1 * | 1/2002 | Aharonson et al. | ........... | 382/186 |
| 6,535,619 B1 * | 3/2003 | Suwa et al. | .................... | 382/101 |
| 6,636,631 B2 * | 10/2003 | Miyazaki et al. | .............. | 382/187 |
| 6,735,566 B1 | 5/2004 | Brand | | |
| 6,754,386 B1 * | 6/2004 | Williamson et al. | .......... | 382/177 |
| 6,819,782 B1 * | 11/2004 | Imagawa et al. | ............... | 382/115 |
| 6,944,317 B2 * | 9/2005 | Pavlovic et al. | .............. | 382/107 |
| 7,171,046 B2 * | 1/2007 | Myers et al. | ................... | 382/187 |

(Continued)

FOREIGN PATENT DOCUMENTS

| | | |
|---|---|---|
| CN | 1615508 A | 5/2005 |
| JP | 2002183662 A | 6/2002 |
| JP | 2007087089 A | 4/2007 |

OTHER PUBLICATIONS

Shamaie et al., Bayesian Fusion of Hidden Markov Models for Understanding Bimanual, Automatic Face and Gesture Recognition, 2004. Proceedings. Sixth IEEE International Conference on, May 2004, pp. 602-607.*

(Continued)

*Primary Examiner* — David Zarka
(74) *Attorney, Agent, or Firm* — Kilpatrick Townsend & Stockton LLP

(57) ABSTRACT

Enhanced rejection of out-of-vocabulary words, in which, based on applying an input gesture to hidden Markov models collectively modeling a vocabulary of training gestures, a likelihood that the input gesture matches each training gesture, and a quantity of states of the input gesture that match corresponding states of a modeled training gesture determined to have a highest likelihood are determined. The input gesture is rejected if the determined quantity does not satisfy a threshold.

24 Claims, 6 Drawing Sheets

(56) References Cited

U.S. PATENT DOCUMENTS

| | | | |
|---|---|---|---|
| 7,308,112 B2* | 12/2007 | Fujimura et al. | 382/103 |
| 2002/0118880 A1* | 8/2002 | Liu et al. | 382/199 |
| 2003/0113018 A1* | 6/2003 | Nefian et al. | 382/181 |
| 2003/0156756 A1* | 8/2003 | Gokturk et al. | 382/190 |
| 2003/0208289 A1 | 11/2003 | Ben-Arie | |
| 2004/0056907 A1 | 3/2004 | Sharma et al. | |
| 2004/0143434 A1 | 7/2004 | Divakaran et al. | |
| 2004/0193413 A1* | 9/2004 | Wilson et al. | 704/243 |
| 2004/0223647 A1* | 11/2004 | Blount et al. | 382/189 |
| 2005/0043948 A1 | 2/2005 | Kashihara et al. | |
| 2005/0100214 A1* | 5/2005 | Zhang et al. | 382/179 |
| 2005/0216867 A1 | 9/2005 | Marvit et al. | |
| 2005/0225638 A1 | 10/2005 | Tanaka et al. | |
| 2005/0229117 A1 | 10/2005 | Hullender et al. | |
| 2005/0238201 A1* | 10/2005 | Shamaie | 382/103 |
| 2005/0257174 A1 | 11/2005 | Wilson | |
| 2006/0018546 A1* | 1/2006 | Lagardere et al. | 382/186 |
| 2007/0005537 A1* | 1/2007 | Abdulkader et al. | 706/20 |
| 2007/0130547 A1* | 6/2007 | Boillot | 715/863 |
| 2007/0189613 A1* | 8/2007 | Tanaka | 382/229 |
| 2008/0310738 A1* | 12/2008 | Katoh et al. | 382/225 |
| 2009/0051648 A1 | 2/2009 | Shamaie et al. | |

OTHER PUBLICATIONS

Shamaie et al., Accurate recognition of large number of hand gestures, 2nd Iranian Conference on Machine Vision and Image Processing, pp. 1-10, Feb. 2003.*

Shamaie et al., Graph-based matching of occluded hand gestures, IEEE Applied Imagery Pattern Recognition Workshop, Oct. 2001, pp. 67-73.*

Shamaie et al., A Dynamic Model for Real-Time Tracking of Hands in Bimanual Movements, In Proceedings of Gesture Workshop, 2003, pp. 172-179.*

Yamato et al., Recognizing Human Act ion in Time-Sequential Images using Hidden Markov Model, Proceedings 1992 IEEE Computer Society Conference on Computer Vision and Pattern Recognition, 1992, pp. 379-385.*

International Search Report and Written Opinion—PCT/US2008/073671, International Search Authority—European Patent Office—Nov. 28, 2008.

* cited by examiner

REJECTING OUT-OF-VOCABULARY WORDS

CROSS-REFERENCE TO RELATED APPLICATIONS

This application claims the benefit of U.S. Provisional Patent Application No. 60/956,776, filed Aug. 20, 2007, and U.S. Provisional Patent Application No. 60/956,784, filed Aug. 20, 2007, which are both incorporated herein by reference.

FIELD

The present disclosure generally relates to interactive devices, and at least one particular implementation relates to interacting with mobile devices using a set of defined gestures.

BACKGROUND

Mobile devices, such as cell phones or personal digital assistants (PDAs), have several functions, each of which may be activated through the user selection of a unique sequence of keys or using on-screen menus. As mobile devices get more and more features, accessing all of the features may become increasingly complex given a limited number of controls capable of being provided on a mobile device.

SUMMARY

According to one general implementation, an input gesture is rejected as being out-of-vocabulary, if the quantity of states of the input gesture does not satisfy a predetermined threshold when compared against the corresponding states of a selected modeled gesture of the vocabulary. Using hidden Markov models, the modeled gesture is selected as the gesture of the vocabulary which is the closest match of the input gesture. Other factors, such as whether the sequence of states of the input gesture matches the corresponding sequence of states of the selected modeled gesture, may be used as a basis for accepting or rejecting the input gesture as being an "in-vocabulary" or "out-of-vocabulary" gesture.

According to another general implementation, a computer-implemented process includes determining, based on applying an input gesture to hidden Markov models collectively modeling a vocabulary of training gestures, a likelihood that the input gesture matches each training gesture, and a quantity of states of the input gesture that match corresponding states of a modeled training gesture determined to have a highest likelihood. The process also includes rejecting the input gesture if the determined quantity does not satisfy a threshold.

Implementations may include one or more of the following features. For example, the input gesture may be recognized if the determined quantity satisfies the threshold, and an application may be controlled based on the recognized input gesture. An input command associated with the modeled training gesture determined to have the highest likelihood may be determined if the determined quantity satisfies the threshold quantity. A second quantity of states of the rejected input gesture that match corresponding states of a second modeled training gesture determined to have a second highest likelihood may be determined, the rejected input gesture may be rejected if the determined second quantity fails to satisfy the threshold. Observation symbols defining the input gesture may be applied to the Hidden Markov Models. The input gesture may be rejected if a sequence of the states of the input gesture does not match a sequence of the corresponding states of the modeled training gesture determined to have the highest likelihood.

In further examples, the input gesture may be rejected if a first or last state of the input gesture does not match a first or last of the corresponding states of the modeled training gesture determined to have the highest likelihood, respectively. The likelihood and a sequence of state changes may be determined using the Viterbi algorithm. If the determined quantity fails to satisfy the threshold, the input gesture may be rejected as being outside of the vocabulary. The hidden Markov models may be trained to recognize the vocabulary of training gestures. A set of state changes associated with the input gesture may be extracted, where the quantity of states of the input gesture may be determined from the extracted set of state changes.

In other examples, determining the quantity of states of the input gesture that match corresponding states of the modeled training gesture determined to have the highest likelihood may further include determining the quantity of states for which an extracted median for the input gesture in each state is greater than or equal to a minimum of extracted medians in a corresponding state for a set of training samples of the modeled training gesture determined to have the highest likelihood, or determining the quantity of states for which an extracted median for the input gesture in each state is greater or equal, by a non-zero adjustment parameter $\epsilon$, to a minimum of extracted medians in a corresponding state for a set of training samples of the modeled training gesture determined to have the highest likelihood. The threshold may be expressed as a quantity of the corresponding states. The input gesture may be normalized.

According to another general implementation, a device includes a processor configured to determine, based on applying an input gesture to hidden Markov models collectively modeling a vocabulary of training gestures, a likelihood that the input gesture matches each training gesture, and a quantity of states of the input gesture that match corresponding states of a modeled training gesture determined to have a highest likelihood. The processor is also configured to reject the input gesture if the determined quantity fails to satisfy a threshold. In example implementations, the device may also include an input module configured to receive the input gesture, where the input module may be an interactive screen comprising a camera.

According to another general implementation, a computer-readable medium encoded with a computer program includes instructions that, when executed, operate to cause a computer to perform operations including determining, based on applying an input gesture to hidden Markov models collectively modeling a vocabulary of training gestures a likelihood that the input gesture matches each training gesture, and a quantity of states of the input gesture that match corresponding states of a modeled training gesture determined to have a highest likelihood. The operations also include rejecting the input gesture if the determined quantity fails to satisfy a threshold.

Implementations of any of the techniques described above may include a method, a process, a system, a device, an apparatus, an interaction interface, instructions stored on a computer-readable medium, or a computer-readable medium encoded with a computer program. The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

Figure 1:
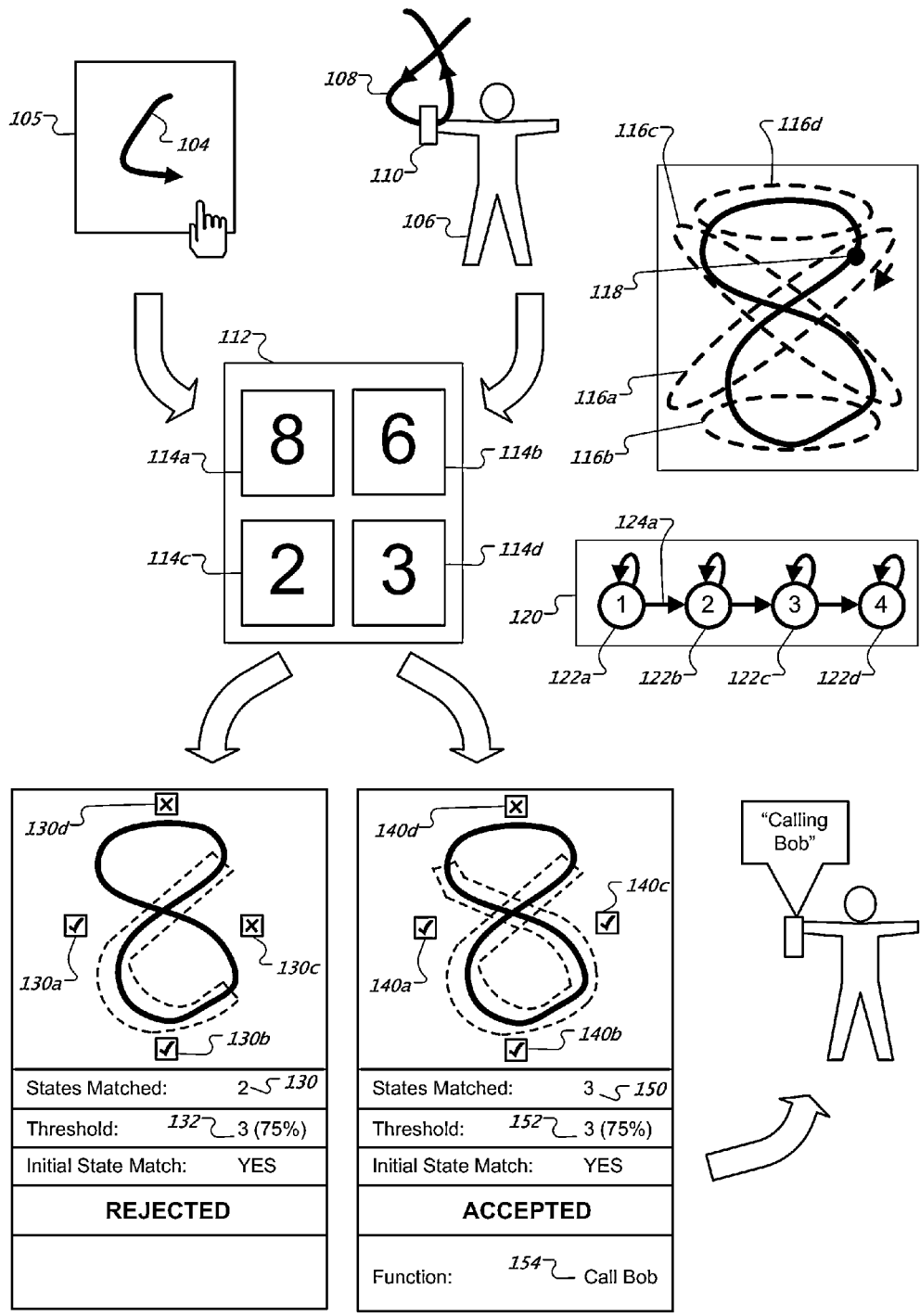
FIG. 1 is a contextual diagram demonstrating gesture recognition and rejection.

According to one general implementation, an input gesture is rejected as being out-of-vocabulary, if the quantity of states of the input gesture does not satisfy a predetermined threshold when compared against the corresponding states of a selected modeled gesture of the vocabulary. Using hidden Markov models, the modeled gesture is selected as the gesture of the vocabulary which is the closest match of the input gesture. Other factors, such as whether the sequence of states of the input gesture matches the corresponding sequence of states of the selected modeled gesture, may be used as a basis for accepting or rejecting the input gesture as being an "in-vocabulary" or "out-of-vocabulary" gesture.

In one example, a user interacts with a device, such as a mobile device, by performing a set of defined gestures. Because mobile devices may be small and held in a hand of a person, the user may perform a gesture while holding a mobile device. A user may gesture using approaches other than moving a mobile device, such as writing with their hand or a stylus on a touch screen or tablet computer. An enhanced approach is provided, in which an input gesture is applied to hidden Markov models collectively modeling a vocabulary of training gestures, and in which the input gesture is either recognized or rejected based on whether a determined likelihood and/or a determined quantity of matched states satisfies a threshold.

As used herein throughout, a "gesture" is intended to refer to a form of non-verbal communication made with part of a human body, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, a hand or body twisting gesture, or a finger pointing gesture. A gesture may be detected using a camera, such as by analyzing an image of a user, using a tilt sensor, such as by detecting an angle that a user is holding or tilting a device, sensing motion of a device, or by any other approach. Gestures may be formed by performing a series of motions in a particular pattern or fashion.

A user may make a gesture (i.e. may "gesture" or "gesticulate") by changing a position of a body part (i.e. a waving motion), or a user may gesticulate without changing a position of a body part (i.e. by making a clenched fist gesture, or by holding a body part immobile for a period of time). Although the enhanced approach uses, as examples, hand, arm or finger gestures, other types of gestures may also be used.

Generally, a gesture is intended to refer to a movement, position, pose, or posture that expresses an idea, opinion, emotion, communication, command, demonstration or expression. A user may gesture while holding a hand-held device, or the user may gesture using one or more body parts while wearing a device on a part of their body. For instance, the user's gesture may be a single or multiple finger gesture; a single hand gesture; a single hand and arm gesture; a single hand and arm, and body gesture; a bimanual gesture; a head pose or posture; an eye position; a facial expression; a body pose or posture, or any other expressive body state.

A gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a movement of a hand while holding a device; a change in a body pose or posture, or a transformation of any other expressive body state.

Gestures may represent characters used in hand-writing recognition technologies, such as Unistrokes, Quikwriting and Graffiti. Hand-writing recognition technologies may include character definitions which allow a user to write characters without lifting a pen.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. A control object may also be a physical device, such as an infrared finger light, a mobile device, a wrist-watch device, a retro-reflector, or a remote control, to name a few examples.

FIG. 1 is a contextual diagram demonstrating gesture recognition and rejection. A first input gesture 104 may be made, such as by drawing with a finger or stylus on a tablet computer 105. As another example of gesture input, a user 106 creates a second input gesture 108 in the air by moving a device 110 through a particular pattern. The device 110, which may be a mobile phone, audio player, a timepiece, or other device, may sense the motion of the device 110 (e.g., using a sensor). The first input gesture 104 and the second input gesture 108 may be represented as input gesture patterns, for example as a set of observation symbols for input to a hidden Markov model, or as dots, pixels or points on a grid, which indicate two-dimensional or three-dimensional locations in space that the gesture crosses. Other approaches may be used for gesture representation, such as representing gestures as a collection of vectors, or as a set of movement directives (e.g., "move right horizontally", then "move up and to the left").

The input gesture patterns associated with the first and second input gestures 104 and 108 may be compared to a vocabulary 112 of modeled training gestures. For example, the vocabulary 112 includes training gestures 114a-d, corresponding to the numbers 8, 6, 2, and 3, respectively.

A temporal sequence such as a sequence of gesture movements may be recognized using a number of hidden Markov models (HMMs). Using HMMs for recognition purposes includes having a set of HMMs (e.g., as many as the number of gestures in the vocabulary 112) and training them with a set of training samples of these gestures. For a given input gesture, trained models can be employed to produce a likelihood that the given input gesture is one of the trained gestures in the vocabulary.

A training gesture, such as the training gesture 114a, may be divided into one or more gesture portions or states. For example, the number "8" may be represented as a first gesture portion 116a, corresponding to the portion of an "8" starting from an upper-right starting point 118 down to the lower-left of the "8", followed by a second gesture portion 116b, corresponding to the bottom portion of an "8", followed by a third gesture portion 116c, corresponding to the lower-right to upper-left portion of an "8", followed by a fourth gesture portion 116d, corresponding to the top portion of an "8".

Gesture portions may correspond to gesture states. A hidden Markov model may include a set of states and state transitions. Gesture states can be illustrated using a topology 120, which in this example includes states 122a-d, which correspond to the gesture portions 116a-d, respectively.

The topology 120 illustrates state transition. For example, the first state 122a may be entered when the gesture portion 116a is performed. The second state 122b may be entered when the gesture portion 116b is performed, as indicated by arrow 124a.

Using a set of hidden Markov models collectively modeling the vocabulary 112, a likelihood can be determined, for each training gesture 114a-d, which indicates the likelihood that an input gesture (e.g., gestures 104, 108) matches a particular training gesture 114a-d. For the training gesture with the highest determined likelihood, a quantity of matched states can be determined. The quantity of matched states can indicate the quantity of states of the input gesture that match corresponding states of the modeled training gesture determined to have a high (or the highest) likelihood.

For example, a likelihood can be determined for each of the training gestures 114a-d indicating the likelihood that the respective training gesture matches the input gesture 104. In this example, the training gesture 114a (e.g., the number "8") has the highest determined likelihood. An indicator 130a indicates that the first input gesture 104 matches the first state 122a of the training gesture 114a, an indicator 130b indicates that the first input gesture 104 matches the second state 122b of the training gesture 114a, an indicator 130c indicates that the first input gesture 104 does not match the third state 122c, of the training gesture 114a, and an indicator 130d indicates that the first input gesture 104 does not match the fourth state 122d of the training gesture 114a.

A quantity 130 can be determined (e.g., "2" in this example), indicating the number of states of the input gesture 104 that match corresponding states of the training gesture 114a. The determined quantity 130 can be compared to a threshold 132, and the input gesture 104 can be rejected (e.g., rejected as being outside of the vocabulary 112) if the determined quantity 130 does not satisfy the threshold 132. As shown in this example, the first input gesture 104 matches two states of the training gesture 114a, which does not satisfy the threshold 132, resulting in the rejection of the input gesture 104 as being out-of-vocabulary.

A likelihood can also be determined for each of the training gestures 114a-d indicating the likelihood that the respective training gesture matches the input gesture 108. In this example, the training gesture 114a again has the highest determined likelihood. Indicators 140a-c indicate that the second input gesture 108 matches the first three states 122a-c of the training gesture 114a. An indicator 140d indicates that the second input gesture 108 does not match the fourth state 122d of the training gesture 114a.

A quantity 150 can be determined (e.g., "3" in this example), indicating the number of states of the input gesture 108 that match corresponding states of the training gesture 114a. The determined quantity 150 can be compared to a threshold 152, and the input gesture 108 can be accepted if the determined quantity 150 satisfies the threshold 152. As shown in this example, the input gesture 108 matches three states of the training gesture 114a, which satisfies the threshold 152, resulting in the acceptance (i.e., recognition) of the input gesture 108, as an in-vocabulary gesture.

An application can be controlled in response to a recognized gesture. For example, in response to the recognition of the input gesture 108 as a match of the training gesture 114a, a table or other data structure can be accessed to determine a function or command to invoke. For example, it can be determined (e.g. using a look-up table) that a "Call Bob" function 154 is mapped to the training gesture 114a, and the function 154 can be invoked in response to recognizing the input gesture 108 as an acceptable match of the training gesture 114a.

Figure 2:
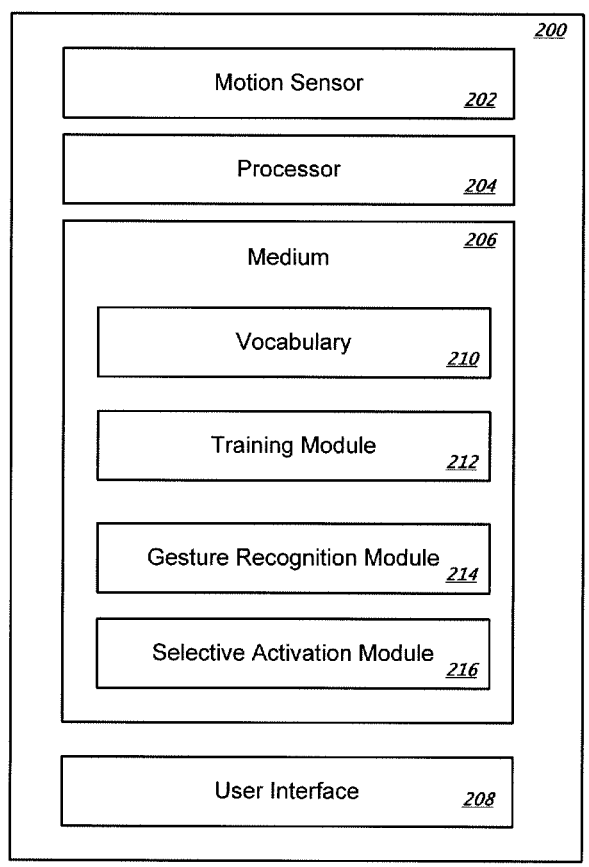
FIG. 2 is a block diagram of a device.

FIG. 2 is a block diagram of a device 200. The device 200 may be a mobile telephone, and/or may be or include a component of a personal computer (PC) or gaming system, a laptop, a handheld or tablet computer, a personal data assistant ("PDA") or another type of embedded system such as a computer keyboard or a remote control. The device 200 also may be an iPod device or other portable music player, a beeper or other communication device, or a handheld or portable electronic device for gaming, communications, timekeeping, and/or data organization. In some implementations, the device 200 is attached to or worn on the user's body. The device 200 includes a motion sensor 202, a processor 204, a medium 206 and a user interface 208.

The motion sensor 202 may detect when the device 200 is moved and may detect the direction and magnitude of movements. The motion sensor 202 may be any type of component or apparatus configured to detect or sense motion or position of the device 200. For example, the motion sensor 202 may be one or more cameras, one or more gyroscopes, one or more GPS (global positioning system) trackers, or a combination of these devices. The motion sensor 202 may be located on the exterior or interior of the device 200 in a variety of positions and orientations.

The processor 204 may accept input from the user interface 208 and may analyze data captured by the motion sensor 202. The processor may execute application programs and operating systems being run on the device 200. The device 200 may include multiple processors (or other control circuitry) and may include memory (or other computer-readable storage media) that stores application programs, operating systems, user input programs, and data used by the application programs, operating systems, and user input programs.

The medium 206 stores and records information or data, and may be an optical storage medium, magnetic storage medium, flash memory, or any other storage medium type. The medium 206 includes a vocabulary 210, a training module 212, a gesture recognition module 214, and a selective activation module 216.

The vocabulary 210 includes information regarding gestures that the device 200 may recognize. For example, the vocabulary 210 may include gesture definitions which describe, for each recognized gesture, a set of trajectories or movements included in a gesture. In other examples, gesture definitions included in the vocabulary 210 may include gesture movement boundaries and/or sets of points which define gesture movement patterns. Gesture definitions may also include information used to define hidden Markov models.

The training module 212 allows a user to customize gestures. For example, a user may repeatedly perform a gesture using a training interface to define the boundaries of a gesture. The training interface may also allow the user to manually size or stretch the boundary of a gesture.

The gesture recognition module 214 receives motion data from the motion sensor 202 and compares the received motion data to motion data stored in the vocabulary 210 to determine whether a recognizable gesture has been performed. For example, the gesture recognition module can use hidden Markov models to compare a determined quantity of matched states to an acceptance threshold.

The selective activation module 216 is used to selectively activate and deactivate gestures in the vocabulary 210. Gestures may be activated and deactivated on a per-user, per-application and/or per-device basis. For example, for an application which uses significant text entry (e.g., an email editor), a "2" character gesture and a "Z" character gesture may both be activated. For an application that has little or no text entry and a relatively small number of commands, one of the "2" or "Z" character gestures may be activated, but not both, since gesture recognition may be more efficient or accurate if similarly shaped gestures are not simultaneously active.

Any approach may be used to input gestures or motion data. For instance, U.S. patent application Ser. No. 12/194,772, filed Aug. 20, 2008 describes an approach in which, instead of selecting a control on a mobile device or on a user interface, a user moves a device through a series of motions that define a gesture (e.g., move their hand or other body part, or move a mobile device), in order to invoke certain functionality that is associated with that gesture.

For instance, a user may create a Z-shaped gesture in the air with a device, such as the device 200, by moving the device in a rightward direction, then in a downward-and-leftward direction, and then in a second rightward direction generally parallel to the first rightward direction. In doing so, functions may be implemented without requiring the use of physical buttons or user interface controls, allowing for smaller mobile devices and user interfaces and effecting increased accuracy in functionality selection.

The device may use a sensor to detect motion. The sensor may be any type of component or apparatus configured to detect or sense motion or position of the device. For instance, the sensor may be one or more built-in cameras, one or more gyroscopes, or one or more global positioning system (GPS) trackers. The device may be equipped with any of these devices or a combination of these devices.

A processor may detect motion of the device based on input from the sensor. For example, in implementations in which the device includes a camera, the processor may detect motion of the mobile device by analyzing a sequence or series of images captured by the camera. In this example, the processor may detect motion of the device by performing an optical flow process on images captured by the camera. In implementations in which the device includes a gyroscope, the processor may detect motion of the device by analyzing data provided by the gyroscope. In these implementations, the trajectory of movement may be detected by the processor through the motion vectors produced by the gyroscope. In implementations in which the device includes a GPS tracker or receiver, the processor may detect motion of the device by analyzing data provided by the GPS tracker or receiver. In these implementations, the processor may determine motion vectors by recording and analyzing relative positions of the device throughout a movement.

In determining a gesture, the processor also may reject gestures not defined in the vocabulary. Rejecting gestures may be important because the processor may distinguish motions not intended to be user input commands from motions intended to be user input commands. Rejecting gestures may be based on hidden Markov models (HMMs). For example, an HMM-based rejection method for recognizing hand gestures may be used to reject arbitrary movements.

Figure 3:
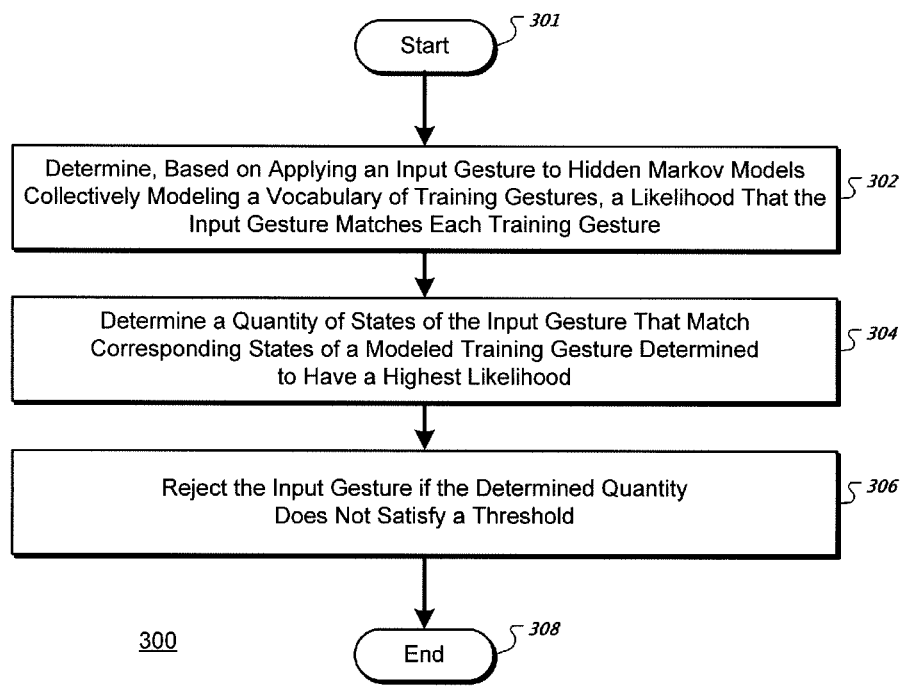
FIG. 3 is a flowchart of an exemplary process.

FIG. 3 is a flowchart illustrating a computer-implemented process 300 that rejects input gestures based on a determined likelihood and a determined quantity of matched states. Briefly, the computer-implemented process 300 includes: determining, based on applying an input gesture to hidden Markov models collectively modeling a vocabulary of training gestures, a likelihood that the input gesture matches each training gesture; determining a quantity of states of the input gesture that match corresponding states of a modeled training gesture determined to have a highest likelihood; and rejecting the input gesture if the determined quantity does not satisfy a threshold.

In further detail, when the process 300 begins (S301), a likelihood that an input gesture matches each of a set of training gestures is determined (S302), based on applying the input gesture to hidden Markov models collectively modeling a vocabulary of training gestures.

For example, an individual hidden Markov model may be assigned to each gesture in the set of training gestures. The size of the gestures may be normalized using the mean and standard deviation of each sample both horizontally and vertically during training and recognition phases. By training the HMMs, the parameters of each model may be extracted.

$\lambda_i=(A_i,B_i,\pi_i)$ denotes an example hidden Markov model $\lambda$ assigned to the ith gesture where $\pi$ represents the vector of probabilities of being in a particular state at the beginning of a session (e.g., at t=1), A represents the state transition matrix, and B represents the observation matrix in which the probabilities of being in a specific state and observing the symbols are given. $V=\{v_1,v_2,\ldots,v_M\}$ represents the set of possible observation symbols. Therefore, a sample of a gesture in the set of training gestures may be represented by a sequence of observation symbols.

In order to generate an appropriate confidence level, the sequence of state changes may be extracted. If each HMM has N states (N≥2), for the training sample k of gesture g, the sequence of states may be extracted using the Viterbi process, according to Equations (1) and (2):

$$S_{g,k}=\{s_{o_1},s_{o_2},\ldots,s_{o_P}\} \quad (1)$$

$$O_{g,k}=\{o_{g,k,1},o_{g,k,2},\ldots,o_{g,k,P}\} \quad (2)$$

$$1 \leq g \leq G$$

In Equation 2, $O_{g,k,j}$ represents the jth observed symbol in the kth training sample of gesture g. In Equation (1), the indices g and k have been eliminated for simplicity.

HMMs may be defined in a way such that when leaving a state there is no way to get back to that state in the remainder of processing a given sequence. In these implementations, each state may be met once for a given sequence of observation symbols, regardless of time spent in that state. As such, $\Phi$ may be defined as the set of training samples, reflected in Equation (3), below:

$$\Phi=\{\Omega_1,\Omega_2,\ldots,\Omega_G\} \quad (3)$$

In Equation (3), G represents the number of words (e.g., gestures) in the vocabulary (e.g., G=4 in the example described with respect to FIG. 1).

$$\Omega_g=\{O_{g,1},O_{g,2},\ldots,O_{g,R}\} \quad (4)$$

Equation (4) represents the set of all training samples for the gesture g. A function f may be defined based on the elements of the observation matrices $B_g$;

$$B = \{B_1, B_2, \ldots, B_G\} \quad (5)$$

$$\delta_{g,n,r} = f(B_{g,n}(O_{g,r})) \quad (6)$$

In Equation (6), $B_{g,n}(O_{g,r})$ represents the set of elements of the observation matrix B of gesture g at state n for the fth training sample given the set of observations $O_{g,r}$ at that state. The function f may be defined as median or another functionality over the mentioned set. Other definitions of function f may include mean, minimum, maximum, etc. Therefore, in implementations in which function f is defined as median, $\delta_{g,n,r}$ is the median of the elements of the set indicated by $B_{g,n}(O_{g,r})$. A second function h may be defined over the set of a $\delta$ for a given word (e.g., a gesture) in the vocabulary:

$$\Delta_{g,n} = \{\delta_{g,n,1}, \delta_{g,n,2}, \ldots, \delta_{g,n,R}\} \quad (7)$$

$$\tau_{g,n} = h(\Delta_{g,n}) \quad (8)$$

In Equation (7), R is the number of training samples for the gesture g, and h in Equation (8) is defined to be the minimum of the given set. Other definitions of h also may be used. Given these definitions, $\tau_{g,n}$ represents the minimum of the medians of the elements of observation matrix B of the gesture g at state n extracted using the set of training samples for this gesture. If each HMM has N states:

$$T_g = \{\tau_{g,1}, \tau_{g,2}, \ldots, \tau_{g,N}\} N \geq 2 \quad (9)$$

The set defined in Equation (9) may be a part of parameters defining a HMM:

$$\Psi_g = (A_g, B_g, \pi_g, T_g) \quad (10)$$

Therefore, for the given input gesture, the trained HMMs are employed to produce a likelihood that the given gesture is one of the trained words in the vocabulary. The HMM that produces the highest likelihood is chosen as the best match. Given a set of trained hidden Markov models, data representing the input gesture may be provided to all the models and the likelihoods that the performed gesture or movement matches any of the trained models may be calculated using the Viterbi process. The model generating the highest probability is the most likely candidate to be a match for the given gesture. This model may be chosen to evaluate the given gesture in order to evaluate how reliably this gesture may be determined to be the same as the gesture represented by the selected model.

Continuing with the process 300, a quantity of states of the input gesture that match corresponding states of a modeled training gesture determined to have a highest likelihood is determined (S304).

The set of state changes for the selected HMM may be extracted (see Equation (11)).

$$\Sigma = \{\sigma_1, \sigma_2, \ldots\} \quad (11)$$

$$\delta_{u,n} = f(B_{g,n}(O_u)) \quad (12)$$

In Equation (12), $B_{g,n}(O_u)$ represents the set of elements of the observation matrix $B_g$ at state n for the given set of observation $O_u$ at that state. Function f may have the same functionality as in Equation (6). Given the extracted values for each state, the number of states the given sequence (e.g., gesture) has passed in the found HMM may be counted. The number of states may be counted using an equation defined as follows:

$$c = \sum_{n=1}^{N} z(d(\delta_{u,n}, \tau_{g,n})) \quad (13)$$

$$z(x) = \begin{cases} 1 & \text{if } x \geq 0 \\ 0 & \text{otherwise} \end{cases} \quad (14)$$

$$d(x, y) = x - y + \varepsilon, \quad -1 \leq \varepsilon \leq 1 \quad (15)$$

In Equation (13), z is the unit step function defined in Equation (14), and $\varepsilon$ in Equation (15) is defined as an adjustable value. Assuming $\varepsilon = 0$, c may be interpreted as the number of states for which the extracted median for the given gesture is larger than or equal to the minimum of extracted medians for the set of training samples of the chosen model. Equation (13) counts the states regardless of their sequence. In other implementations, we may have an alternate definition as follows:

$$q_n = z(d(\delta_{u,n}, \tau_{g,n})) \cdot q_{n-1}, q_0 = 1 \quad (16)$$

$$c' = \sum_{n=1}^{N} q_n \quad (17)$$

Equation (17) counts the number of states in the correct order as defined by the HMM.

Continuing with the process 300, the input gesture is rejected if the determined quantity does not satisfy a threshold (S306), thereby ending the process 300 (S308). For example, based on the number of states a given gesture has passed, c or c' from Equations (13) and (17), a determination may be made as to whether the found model reliably or accurately matches the given input gesture. The threshold may be expressed as a quantity or as a percentage of the total quantity of the corresponding states. The threshold may be configurable, such as by a manufacturer or an application developer.

In some implementations, two adjustable variables of $\varepsilon$ and the acceptable value of c or c' provide the process with the flexibility to accept or reject a gesture based on how close the gesture matches all parts of the most probable trained gesture in the vocabulary. The parameter $\varepsilon$ adjusts the acceptable distance between the median of the observed symbols and the trained median of symbols extracted during the training phase. Setting $\varepsilon$ to zero means that the observed median must be equal or greater than the minimum of the medians observed during training for the given state of the matched HMM.

The value of c or c' represents the number of states that have been determined to have been successfully met. A restrictive criterion may require all the states to be met while a lower value may be acceptable if some flexibility is going to be given to the gestures. Therefore, c' may be more restrictive than c because c' may require the previous state to have been passed successfully such that an order of states defined by the HMM is taken into account.

An input gesture can be rejected if a sequence of the states of the input gesture does not match a sequence of the corresponding states of the modeled training gesture determined to have the highest likelihood by the corresponding HMM. For example, a user may draw a "2", matching all parts of a modeled training gesture representing a "2", but may draw the "2" backwards, or in a sequence the reverse of the sequence defined in the HMM for the training gesture. The "backwards 2" can be rejected due to the mismatch in state sequence. As another example, a user may create an "8" by drawing or gesturing one circle on top of a second circle, which may match all parts of a training gesture representing an "8", but may not match the sequence defined by the training gesture. As discussed in more detail below, an input gesture may be rejected if a first or last state of the input gesture does not match a first or last of the corresponding states of the modeled training gesture determined to have the highest likelihood.

If an input gesture is rejected as a match for the training gesture with the highest determined likelihood, a second most likely gesture (and possibly additional gestures) can be considered as potential matches before deciding a final rejection of the input gesture. For example, a second modeled training gesture can be determined to have a second highest likelihood. A second quantity of states of the input gesture that match corresponding states of the second modeled training gesture can be determined. The input gesture can be rejected if the determined second quantity fails to satisfy the threshold. For example, if a user gestures an "S" shape, the input gesture can be compared to a highest likelihood training gesture representing an "8", and if the input gesture is determined to not match the "8", the input gesture can be compared to a second highest likelihood training gesture representing a "5".

A person or user may perform a number of gestures on an interactive table where a camera underneath the table's screen images the position of the finger of user and tracks the position to recognize gestures. In some implementations, digits of "0" to "9" and calculation signs of "plus," "minus" and "equal" may be defined as the set of gestures in the vocabulary. An individual 4-state HMM may be assigned to each gesture and may be trained using a particular number of training samples (e.g., thirty), the forward-backward process, and the process discussed above.

The size of the gestures may be normalized using the mean and standard deviation of each sample both horizontally and vertically during training and recognition phases. Using the trained models, a set of forty-six gestures was performed including mainly the gestures that are not defined in the vocabulary. However, a number of gestures defined in the vocabulary also were included in this set in order to examine the accuracy of the process. The gestures may be defined as raw, not-normalized movements of a hand. The raw data may be normalized prior to being sent to the recognition process.

Figure 4:
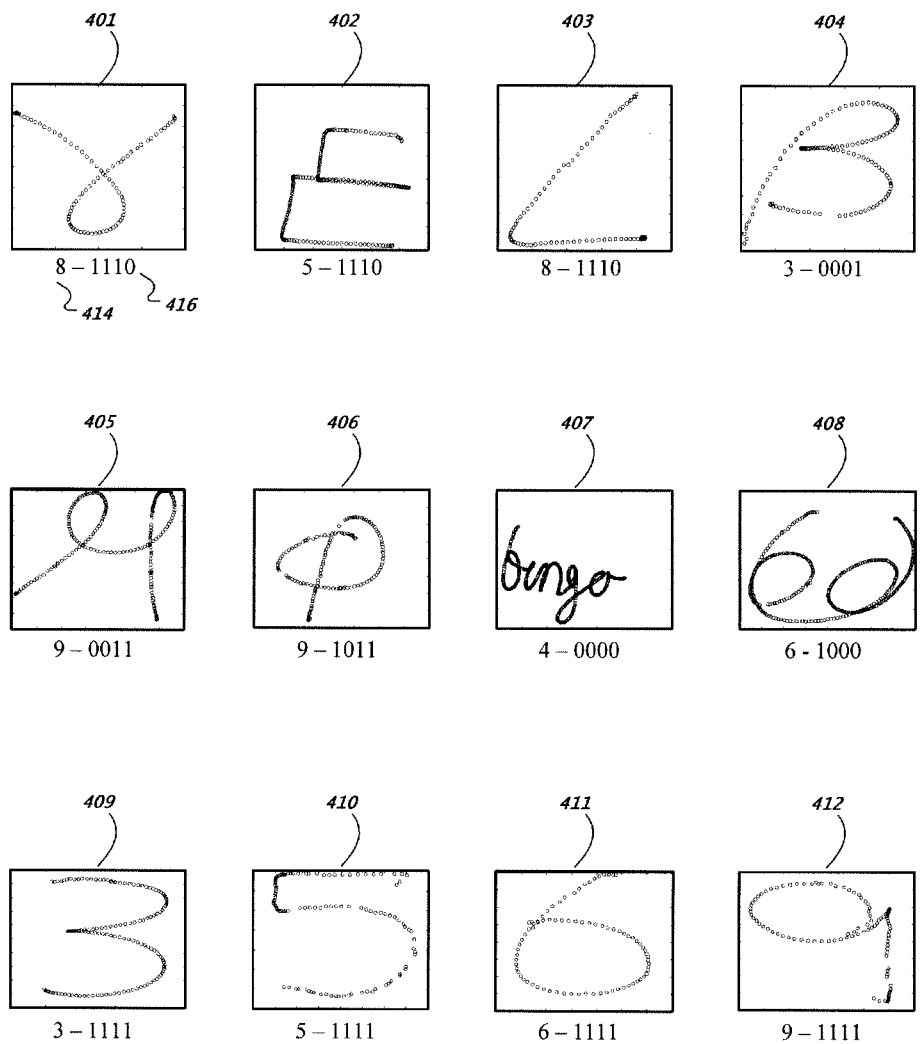
FIG. 4 illustrates example gestures.

FIG. 4 illustrates example gestures 401-412. The first number below each gesture (e.g., the "8" 414 below gesture 401) indicates the gesture recognized by the HMMs as the best match, and the second number (e.g., the "1110" 416 below gesture 401) is an indication of which of the four states of the gesture met the criteria explained in the exemplary process, expressed a sequence of binary digits. For example, "1011" means the first, third, and fourth states passed but the second state failed. In this example, the parameter ($\epsilon$) that adjusts the acceptable distance between the median of the observed symbols and the trained median of symbols extracted during the training phase is assumed to be zero ($\epsilon$=0).

Gesture 401 illustrates a gesture that is similar to the digit 8 except for the last state. Using the exemplary process 300, the first three states meet the criteria of being the gesture for digit 8, but the last state does not meet the defined criteria. The process shows the first three states have passed for gesture 402, which is recognized as the gesture for digit 5. The gesture 402 is in some ways similar to the gesture for digit 5, however the end of the gesture 402 is not similar to the digit 5.

Gesture 403 is similar to states of the digit 8, except for the last state. Using the exemplary process, the first three states meet the criteria of being the gesture for digit 8, but the last state does not meet the defined criteria. Gesture 404 is similar to the digit 3 except for the beginning state. Using the exemplary process, the first three states do not meet the criteria of being the gesture for digit 3, but the last state does meet the criteria.

Gestures 405 and 406 are both recognized to be most similar to the gesture for the digit 9. However, in gesture 405, the beginning of the gesture is very different from that of the digit 9. The gesture 405 passes the third and the fourth states. In gesture 406, the gesture starts similar to the digit 9, continues in a way dissimilar to the digit 9, and then becomes similar to the gesture for the digit 9 again as it reaches the end of movement. The first, third and fourth states of the gesture 406 meet the defined criteria, but the second state does not.

Gesture 407 is not similar to any of the defined gestures, but is recognized as being most similar to the digit 4. Using the exemplary process, none of the states meet the criteria of being the gesture for digit 4. Gesture 408 is similar to the beginning of the digit 6, but differs from the digit 6 toward the end of the gesture. Using the exemplary process, the first state meets the criteria of being the gesture for the digit 6, but the last three states do not meet the criteria. Gestures 409 to 412 illustrate movements similar to defined digit gestures. As shown, for gestures 409 to 412, all four states meet the defined criteria.

A threshold can be defined which can be used as a basis for accepting and rejecting a gesture. If a gesture passes at least the number of states defined by the threshold, the gesture can be accepted. If a gesture does not pass at least the number of states defined by the threshold, the gesture can be rejected. For example, if a threshold of 3 is defined, the gestures 401-403, 406, and 409-412 can be accepted since those gestures have passed at least 3 states. The gestures 404, 405, 407, and 408 can be rejected since they have not passed at least 3 states.

Additionally or alternatively, a gesture can be rejected if it does not pass a begin and/or an end state. For example, gestures 401-403, even though they have passed 3 states and have passed the first state, may be rejected because they have not passed the end state. As another example, the gesture 404 may be rejected because, although a portion of the gesture looks like a '3', the gesture has not passed the first state.

Figure 5:
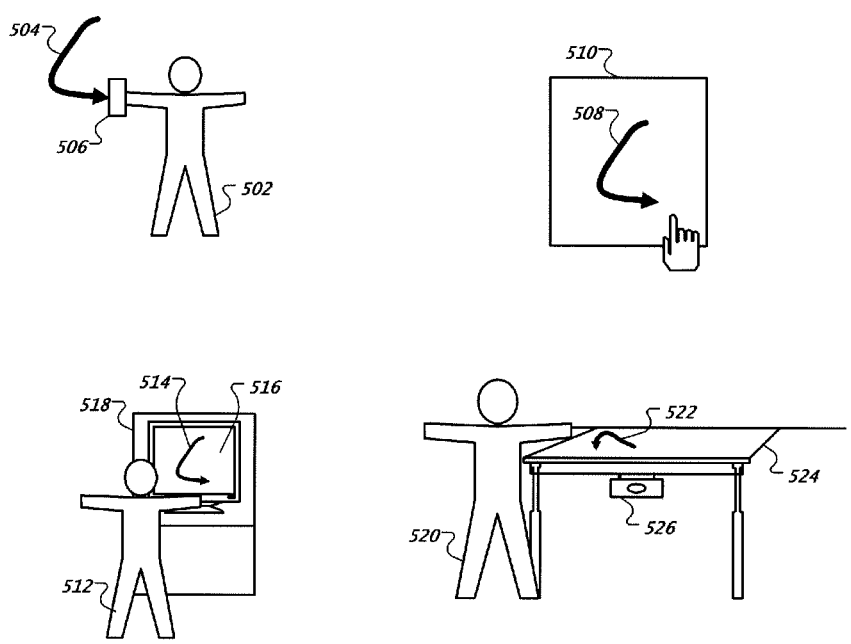
FIG. 5 illustrates various approaches for recognizing gestures.

As described above and as shown in FIG. 5, a user 502 can make a gesture 504 in the air using a device 506. A user may also make gestures using various other approaches. For example, a user may make a gesture 508 on a tablet computer 510 using a finger or a stylus. A user 512 may also make a gesture 514 on a touch screen 516, such as if the touch screen 516 is included in a kiosk 518. As another example, a user 520 may make a gesture 522 on an interactive table 524, where the gesture 522 is recognized by a camera 526 which may be positioned underneath the table 524.

Figure 6:
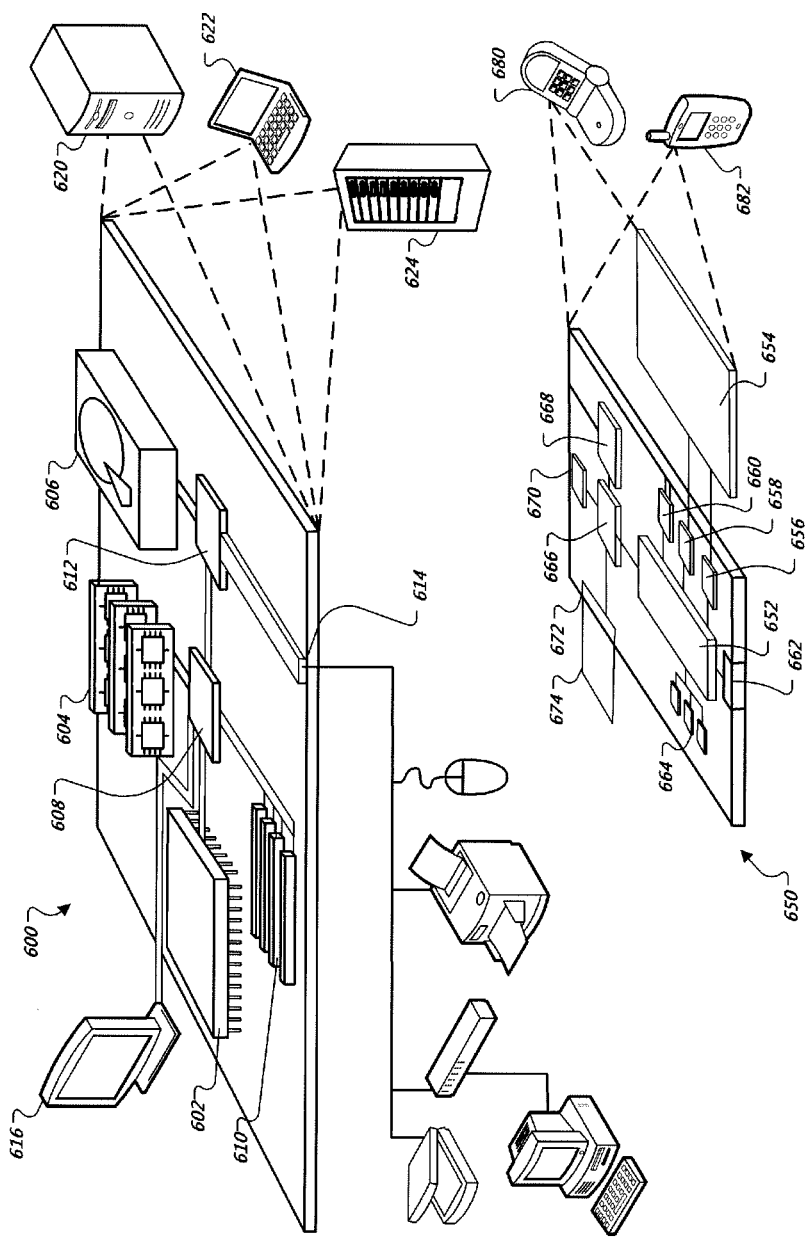
FIG. 6 illustrates exemplary computing devices.

FIG. 6 is a block diagram of computing devices 600, 650 that may be used to implement the systems, methods and processes described herein, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 1612 manages lower bandwidth-intensive operations. Such allocation of duties is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other. The computing device 600 may include one or more sensors (not shown), such as gyroscopes, cameras or GPS (Global Positioning Satellite) trackers, configured to detect or sense motion or position of the computing device 600.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate. The computing device 650 may include one or more sensors (not shown), such as gyroscopes, cameras or GPS (Global Positioning Satellite) trackers, configured to detect or sense motion or position of the computing device 600.

The processor 652 may process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   determining, based on applying an input gesture to a vocabulary of modeled training gestures:
   a likelihood that the input gesture matches each modeled training gesture, and
   a modeled training gesture having a highest likelihood;
   subsequent to determining the modeled training gesture having the highest likelihood, determining a quantity of states of the input gesture that match corresponding states of the modeled training gesture determined to have the highest likelihood, wherein each state of both the input gesture and the modeled training gesture comprises a portion of a gesture; and
   rejecting, with a processor, the input gesture if the determined quantity of matching states does not satisfy a threshold, wherein the threshold expresses a quantity or percentage of the total quantity of the states of the input gesture.

2. The method of claim 1, further comprising recognizing the input gesture if the determined quantity satisfies the threshold.

3. The method of claim 2, further comprising controlling an application based on the recognized input gesture.

4. The method of claim 2, further comprising determining an input command associated with the modeled training gesture determined to have the highest likelihood if the determined quantity satisfies the threshold.

5. The method of claim 1, further comprising:
   determining a second quantity of states of the rejected input gesture that match corresponding states of a second modeled training gesture determined to have a second highest likelihood; and
   rejecting the rejected input gesture if the determined second quantity fails to satisfy the threshold.

6. The method of claim 1, further comprising:
   applying observation symbols defining the input gesture to hidden Markov models.

7. The method of claim 1, further comprising:
rejecting the input gesture if a sequence of states of the input gesture does not match a sequence of the corresponding states of the modeled training gesture determined to have the highest likelihood.

8. The method of claim 1, wherein the likelihood and a sequence of state changes are determined using the Viterbi algorithm.

9. The method of claim 1, wherein, if the determined quantity fails to satisfy the threshold, the input gesture is rejected as being outside of the vocabulary.

10. The method of claim 1, further comprising: training hidden Markov models to recognize the vocabulary of training gestures.

11. The method of claim 1, further comprising:
extracting a set of state changes associated with the input gesture,
wherein the quantity of states of the input gesture are determined from the extracted set of state changes.

12. The method of claim 1, wherein the threshold is expressed as a quantity of the corresponding states.

13. The method of claim 1, further comprising normalizing the input gesture.

14. A computer-implemented method comprising:
determining, based on applying an input gesture to a vocabulary of modeled training gestures:
a likelihood that the input gesture matches each training gesture, and
a quantity of states of the input gesture that match corresponding states of a modeled training gesture determined to have a highest likelihood; and
rejecting, with a processor, the input gesture if the determined quantity does not satisfy a threshold;
wherein determining the quantity of states of the input gesture that match corresponding states of the modeled training gesture determined to have the highest likelihood further comprises:
determining the quantity of states for which an extracted median for the input gesture in each state is greater than or equal to a minimum of extracted medians in a corresponding state for a set of training samples of the modeled training gesture determined to have the highest likelihood.

15. The method of claim 14, wherein determining the quantity of states of the input gesture that match corresponding states of the modeled training gesture determined to have the highest likelihood further comprises:
determining the quantity of states for which an extracted median for the input gesture in each state is greater or equal, by a non-zero adjustment parameter c, to a minimum of extracted medians in a corresponding state for a set of training samples of the modeled training gesture determined to have the highest likelihood.

16. A device comprising a processor configured to:
determine, based on applying an input gesture to a vocabulary of modeled training gestures:
a likelihood that the input gesture matches each modeled training gesture, and
a modeled training gesture having a highest likelihood;
subsequent to determining the modeled training gesture having the highest likelihood, determine a quantity of states of the input gesture that match corresponding states of the modeled training gesture determined to have the highest likelihood, wherein each state of both the input gesture and the modeled training gesture comprises a portion of a gesture; and
reject the input gesture if the determined quantity of matching states fails to satisfy a threshold, wherein the threshold expresses a quantity or percentage of the total quantity of the states of the input gesture.

17. The device of claim 16, further comprising: an input module configured to receive the input gesture.

18. The device of claim 17, wherein the input module is an interactive screen comprising a camera.

19. The device of claim 16, wherein the likelihood and a sequence of state changes are determined using the Viterbi algorithm.

20. A non-transitory computer-readable medium encoded with a computer program comprising instructions that, when executed, operate to cause a computer to perform operations comprising:
determining, based on applying an input gesture to a vocabulary of modeled training gestures:
a likelihood that the input gesture matches each modeled training gesture, and
a modeled training gesture having a highest likelihood;
subsequent to determining the modeled training gesture having the highest likelihood, determining a quantity of states of the input gesture that match corresponding states of a modeled training gesture determined to have the highest likelihood, wherein each state of both the input gesture and the modeled training gesture comprises a portion of a gesture; and
rejecting the input gesture if the determined quantity of matching states fails to satisfy a threshold, wherein the threshold expresses a quantity or percentage of the total quantity of the states of the input gesture.

21. An apparatus comprising:
means for determining, based on applying an input gesture to a vocabulary of modeled training gestures:
a likelihood that the input gesture matches each modeled training gesture, and
a modeled training gesture having a highest likelihood;
means for determining, subsequent to determining the modeled training gesture having the highest likelihood, a quantity of states of the input gesture that match corresponding states of the modeled training gesture determined to have the highest likelihood, wherein each state of both the input gesture and the modeled training gesture comprises a portion of a gesture; and
means for rejecting the input gesture if the determined quantity of matching states does not satisfy a threshold, wherein the threshold expresses a quantity or percentage of the total quantity of the states of the input gesture.

22. The apparatus of claim 21, further comprising means for recognizing the input gesture if the determined quantity satisfies the threshold.

23. The apparatus of claim 21, wherein, if the determined quantity fails to satisfy the threshold, the input gesture is rejected as being outside of the vocabulary.

24. The apparatus of claim 21, wherein the means for determining the quantity of states of the input gesture that match corresponding states of the modeled training gesture determined to have the highest likelihood further comprises:
means for determining the quantity of states for which an extracted median for the input gesture in each state is greater than or equal to a minimum of extracted medians in a corresponding state for a set of training samples of the modeled training gesture determined to have the highest likelihood.

* * * * *